United States Patent
Maekawa

(10) Patent No.: US 10,434,822 B2
(45) Date of Patent: Oct. 8, 2019

(54) PNEUMATIC TIRE

(71) Applicant: Sumitomo Rubber Industries, Ltd., Kobe-shi, Hyogo (JP)

(72) Inventor: Natsuki Maekawa, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 59 days.

(21) Appl. No.: 15/889,884

(22) Filed: Feb. 6, 2018

(65) Prior Publication Data
US 2018/0236816 A1 Aug. 23, 2018

(30) Foreign Application Priority Data
Feb. 21, 2017 (JP) .................................. 2017-030106

(51) Int. Cl.
*C08L 9/06* (2006.01)
*B60C 1/00* (2006.01)

(52) U.S. Cl.
CPC .............. *B60C 1/0016* (2013.01); *C08L 9/06* (2013.01); *B60C 2200/04* (2013.01); *B60C 2200/10* (2013.01); *C08L 2205/025* (2013.01); *C08L 2205/03* (2013.01); *C08L 2666/55* (2013.01)

(58) Field of Classification Search
None
See application file for complete search history.

(56) References Cited

U.S. PATENT DOCUMENTS

| 5,877,249 A * | 3/1999 | Lambotte .............. B60C 1/0016 152/905 |
| 2003/0092783 A1* | 5/2003 | Udagawa ................ B29B 17/02 521/38 |
| 2006/0217481 A1* | 9/2006 | Otsuki .................... B60C 15/06 524/493 |
| 2010/0004371 A1* | 1/2010 | Pan .......................... C08L 9/06 524/424 |
| 2013/0338256 A1* | 12/2013 | Steiner ...................... C08L 9/06 523/156 |
| 2016/0159147 A1* | 6/2016 | Isitman ................. B60C 1/0016 524/508 |
| 2017/0267027 A1* | 9/2017 | Kunisawa ............... B60C 11/00 |

FOREIGN PATENT DOCUMENTS

JP      2005-350535 A      12/2005

* cited by examiner

*Primary Examiner* — Richard A Huhn
(74) *Attorney, Agent, or Firm* — Birch, Stewart, Kolasch & Birch, LLP

(57) ABSTRACT

Provided is a pneumatic tire having excellent wet grip performance. The present invention relates to a pneumatic tire including a tread formed from a rubber composition, the rubber composition having a tan δ and an E*, which at 0° C. satisfy the following relationship:

tan $\delta/E^{*0.3} \geq 0.18$.

6 Claims, 3 Drawing Sheets

FIG.6

PNEUMATIC TIRE

TECHNICAL FIELD

The present invention relates to a pneumatic tire.

BACKGROUND ART

Various techniques have been proposed for improving wet grip performance of pneumatic tires. For example, Patent Literature 1 discloses a technique using a resin. Lately, however, it has been desired to further improve wet grip performance.

CITATION LIST

Patent Literature

Patent Literature 1: JP 2005-350535 A

SUMMARY OF INVENTION

Technical Problem

The present invention aims to solve the above problem and provide a pneumatic tire having excellent wet grip performance.

Solution to Problem

In general, wet grip performance is considered to correlate with the tan δ measured at about 0° C. As shown in FIGS. 1 to 3, which will be described later, the experiments conducted by the present inventor demonstrate that the tan δ measured at 0° C. has a higher correlation with wet grip performance than the E* or glass transition temperature does.

Based on these results, the present inventor conducted extensive research and found that the value calculated using a special formula, i.e., by dividing tan δ by $E^{*0.3}$, strongly correlates with wet grip performance. As a result of further research, the inventor has found that good wet grip performance is ensured when the value of tan $\delta/E^{*0.3}$ is within a predetermined range. Thus, the present inventor arrived at the present invention.

Specifically, the present invention relates to a pneumatic tire, including a tread formed from a rubber composition, the rubber composition having a tan δ and an E*, which at 0° C. satisfy the following relationship:

$$\tan \delta/E^{*0.3} \geq 0.18.$$

Preferably, the tan δ and the E* satisfy the following relationship:

$$\tan \delta/E^{*0.3} \geq 0.23.$$

Preferably, the tan δ is 0.420 to 0.680, and the E* is 16.50 to 30.20 Mpa.

Preferably, the rubber composition has a glass transition temperature of −40° C. or higher.

Preferably, the rubber composition contains a carbon black having a nitrogen adsorption specific surface area of 60 to 150 m²/g and a resin.

Preferably, the pneumatic tire of the present invention is a motorcycle tire.

Advantageous Effects of Invention

The pneumatic tire of the present invention includes a tread formed from a rubber composition having a tan δ and an E*, which at 0° C. satisfy the above relationship. Such a pneumatic tire provides excellent wet grip performance.

DESCRIPTION OF EMBODIMENTS

Figure 1:
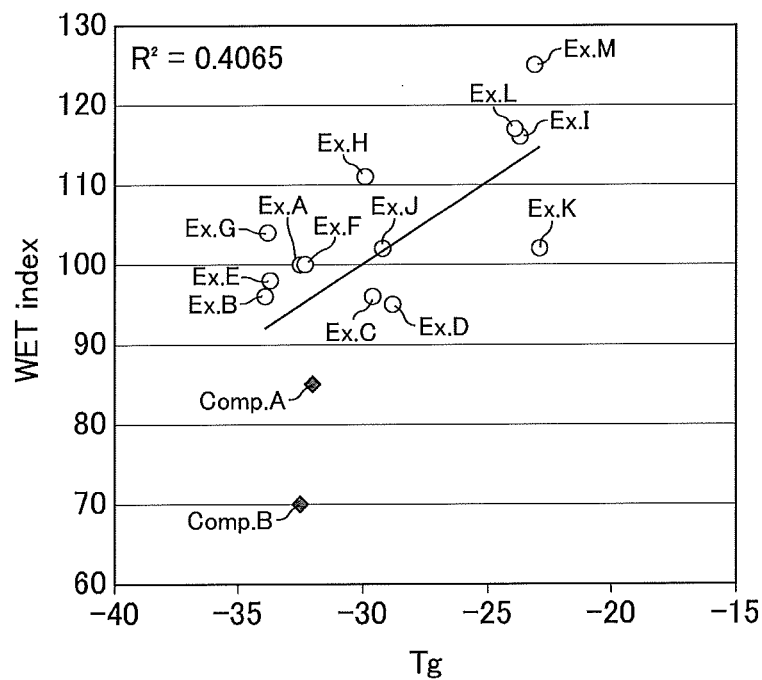
FIG. 1 shows a scatter plot of the variables: Tg and WET index.

The pneumatic tire of the present invention includes a tread formed from a rubber composition having a tan δ and an E*, which at 0° C. satisfy the following relationship:

$$\tan \delta/E^{*0.3} \geq 0.18.$$

Owing to the use of a rubber composition having a value of tan $\delta/E^{*0.3}$ of 0.18 or higher as a tread, the pneumatic tire provides excellent wet grip performance. To obtain better wet grip performance, the tan $\delta/E^{*0.3}$ is preferably 0.23 or higher.

The upper limit of the tan $\delta/E^{*0.3}$ is not particularly critical, but is preferably 0.3 or lower.

Herein, the tan δ and E* are determined by performing viscoelastic testing on the vulcanized rubber composition at 0° C. Specifically, these property values are measured as described later in EXAMPLES.

The tan δ is preferably 0.420 to 0.680. The E* is preferably 16.50 to 30.20 Mpa.

The tan δ and E* of a rubber composition greatly depend on the rubber component, fillers, and resins (tackifying resins) incorporated in the rubber composition. Thus, it is important to select the type and amount of these components so as to adjust the tan $\delta/E^{*0.3}$ within a predetermined range.

The rubber component, fillers, and resins suitable to adjust the tan $\delta/E^{*0.3}$ to 0.18 or higher are described below.

The rubber component includes, for example, diene rubbers such as natural rubber (NR), epoxidized natural rubber (ENR), polyisoprene rubber (IR), polybutadiene rubber (BR), styrene-butadiene rubber (SBR), acrylonitrile-butadiene rubber (NBR), chloroprene rubber (CR), butyl rubber (IIR), and styrene-isoprene-butadiene copolymer rubber (SIBR). Each of these rubbers may be used alone, or two or more of these may be used in combination. Among these, SBR is preferred.

The SBR preferably has a glass transition temperature (Tg) of −60° C. or higher, more preferably −45° C. or higher, still more preferably −40° C. or higher. The upper limit of the Tg is not particularly critical, but is preferably −10° C. or lower.

Herein, the Tg of the SBR is measured with a differential scanning calorimeter (Q200, TA Instruments, Japan) at a rate of temperature increase of 10° C./min in accordance with JIS K 7121:1987.

The SBR preferably has a styrene content of 20% by mass or more, more preferably 30% by mass or more, but preferably 50% by mass or less, more preferably 40% by mass or less.

The styrene content is determined by $^1$H-NMR.

The SBR preferably has a vinyl content of 15% by mass or more, more preferably 30% by mass or more, but preferably 50% by mass or less, more preferably 40% by mass or less.

The vinyl content is determined by infrared absorption spectrometry.

The SBR preferably has a weight average molecular weight (Mw) of 500,000 or more, more preferably 600,000 or more, still more preferably 900,000 or more, but preferably 1,200,000 or less, more preferably 1,100,000 or less.

The Mw may be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

The SBR content based on 100% by mass of the rubber component is preferably 70% by mass or more, more preferably 90% by mass or more, still more preferably 100% by mass.

The filler may suitably be carbon black.

The carbon black preferably has a nitrogen adsorption specific surface area ($N_2SA$) of 60 $m^2/g$ or more, more preferably 100 $m^2/g$ or more, but preferably 150 $m^2/g$ or less, more preferably 120 $m^2/g$ or less.

Herein, the $N_2SA$ of the carbon black is determined in accordance with ASTM D4820-93.

The carbon black content per 100 parts by mass of the rubber component is preferably 60 parts by mass or more, more preferably 90 parts by mass or more, but is preferably 150 parts by mass or less, more preferably 120 parts by mass or less.

The filler may be silica.

The silica preferably has a nitrogen adsorption specific surface area ($N_2SA$) of 100 $m^2/g$ or more, more preferably 150 $m^2/g$ or more, but preferably 300 $m^2/g$ or less, more preferably 200 $m^2/g$ or less.

The $N_2SA$ of the silica is determined in accordance with ASTM D1993-03.

In the case where the rubber composition in the present invention contains silica, the silica content per 100 parts by mass of the rubber component is preferably 10 parts by mass or more, more preferably 20 parts by mass or more, but is preferably 60 parts by mass or less, more preferably 50 parts by mass or less.

Examples of the resin include coumarone resins, indene resins, coumarone-indene resins, and α-methylstyrene resins. Each of these resins may be used alone, or two or more of these may be used in combination. Preferred among these are coumarone-indene resins or α-methylstyrene resins.

Coumarone-indene resins are mainly derived from coumarone and indene, and α-methylstyrene resins are mainly derived from α-methylstyrene. These resins may further contain other monomer components such as styrene.

The resin preferably has a softening point of 60° C. or higher, more preferably 80° C. or higher, but preferably 180° C. or lower, more preferably 150° C. or lower.

Herein, the softening point of the resin is determined as set forth in JIS K 6220-1:2001 using a ring and ball softening point measuring apparatus and is defined as the temperature at which the ball drops down.

In the case where the rubber composition in the present invention contains a resin, the resin content per 100 parts by mass of the rubber component is preferably 3 parts by mass or more, more preferably 5 parts by mass or more, but is preferably 20 parts by mass or less, more preferably 15 parts by mass or less.

The rubber composition in the present invention may appropriately contain, in addition to the components described above, other compounding materials commonly used in the tire industry, such as waxes, zinc oxide, stearic acid, releasing agents, antioxidants, vulcanization accelerators, and sulfur.

The rubber composition in the present invention preferably has a glass transition temperature (Tg) of −40° C. or higher, more preferably −35° C. or higher. The upper limit of the Tg is not particularly critical, but is preferably −10° C. or lower.

The pneumatic tire of the present invention may be produced using the rubber composition by conventional methods.

Specifically, the unvulcanized rubber composition incorporating the components may be extruded into the shape of a tire tread, and assembled with other tire components in a usual manner on a tire building machine to build an unvulcanized tire, which is then heated and pressurized in a vulcanizer, whereby the tire can be produced.

The pneumatic tire of the present invention is suitable as a motorcycle tire that requires particularly excellent wet grip performance.

EXAMPLES

The present invention will be specifically described with reference to, but not limited to, examples below.

The chemicals used in the examples and comparative examples are listed below.

SBR 1: oil extended SBR (Tg: −39° C., styrene content: 32% by mass, vinyl content: 34% by mass, Mw: 1,060,000, oil content per 100 parts by mass of rubber solids: 37.5 parts by mass)

SBR 2: non-oil extended SBR (Tg: −56° C., styrene content: 23% by mass, vinyl content: 17% by mass, Mw: 510,000)

SBR 3: oil extended SBR (Tg: −55° C., styrene content: 25% by mass, vinyl content: 15% by mass, Mw: 760,000, oil content per 100 parts by mass of rubber solids: 37.5 parts by mass)

SBR 4: oil extended SBR (Tg: −43° C., styrene content: 37% by mass, vinyl content: 16% by mass, Mw: 640,000, oil content per 100 parts by mass of rubber solids: 34 parts by mass)

Carbon black N351H: SHOBLACK N351H ($N_2SA$: 69 $m^2/g$) available from Cabot Japan K.K.

Carbon black N330: SHOBLACK N330 ($N_2SA$: 75 $m^2/g$) available from Cabot Japan K.K.

Carbon black N220: DIABLACK N220 ($N_2SA$: 114 $m^2/g$) available from Mitsubishi Chemical Corporation Silica: Ultrasil VN3 ($N_2SA$: 175 $m^2/g$) available from Evonik Degussa Resin SA85: SYLVARES SA85 (α-methylstyrene resin (copolymer of α-methylstyrene and styrene), softening point: 85° C.) available from Arizona Chemical Resin V-120: Nittoresin coumarone V120 (coumarone-indene resin, softening point: 120° C.) available from Nitto Chemical Co., Ltd.

EXAMPLES AND COMPARATIVE EXAMPLES

According to each of the formulations indicated in Table 1, the components were kneaded to obtain an unvulcanized rubber composition. Note that only the rubber component, fillers, and resins are listed in Table 1, but 25 parts by mass of an oil, 2 parts by mass of sulfur, 2 parts by mass of a vulcanization accelerator, 2 parts by mass of an antioxidant, 2 parts by mass of stearic acid, and 2 parts by mass of zinc oxide were also used as common components in addition to these components.

The unvulcanized rubber composition was press-vulcanized at 160° C. for 20 minutes to obtain a vulcanized rubber composition.

Separately, the unvulcanized rubber composition was extruded into a tread shape, assembled with other tire components on a tire building machine, and vulcanized at 160° C. for 20 minutes to prepare a test tire.

The vulcanized rubber compositions and test tires prepared as above were evaluated for the following properties. Table 1 shows the results.

Glass Transition Temperature (Tg)

The glass transition temperature (Tg) of the vulcanized rubber composition was measured with an automatic differential scanning calorimeter (DSC-60A, Shimadzu Corporation) at a rate of temperature increase of 10° C./min in accordance with JIS K 7121.

Viscoelastic Testing

The complex modulus ($E^*$(MPa)) and loss tangent (tan δ) of the vulcanized rubber composition were measured using a viscoelastic spectrometer VES (Iwamoto Seisakusho Co., Ltd.) at a temperature of 0° C., a frequency of 10 Hz, an initial strain of 10%, and a dynamic strain of 2%.

Wet Grip Performance

Each set of the test tires was mounted on a front-engine, front-wheel-drive car of 2,000 cc displacement made in Japan. The car was subjected to an on-vehicle test under the conditions below. The results are expressed as an index (WET index), with Example A set equal to 100. A higher index indicates better wet grip performance. An index of 95 or higher means good wet grip performance.

On-Vehicle Test Conditions

Road: Cobbled road on the Okayama Test Course
Speed: After entry at 50 km/h, the braking distance required to reach 40 to 10 km/h was measured using GPS.
Braking: Full ABS
Tire size: 120/70ZR17 D222F
Internal pressure: 250 kPa

Correlation

Figure 2:
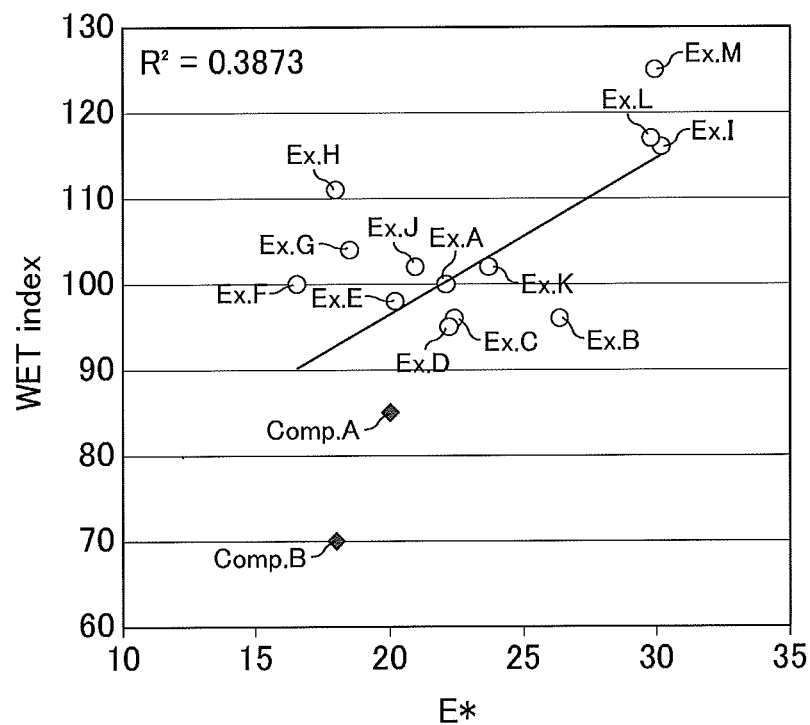
FIG. 2 shows a scatter plot of the variables: E* and WET index.
Figure 3:
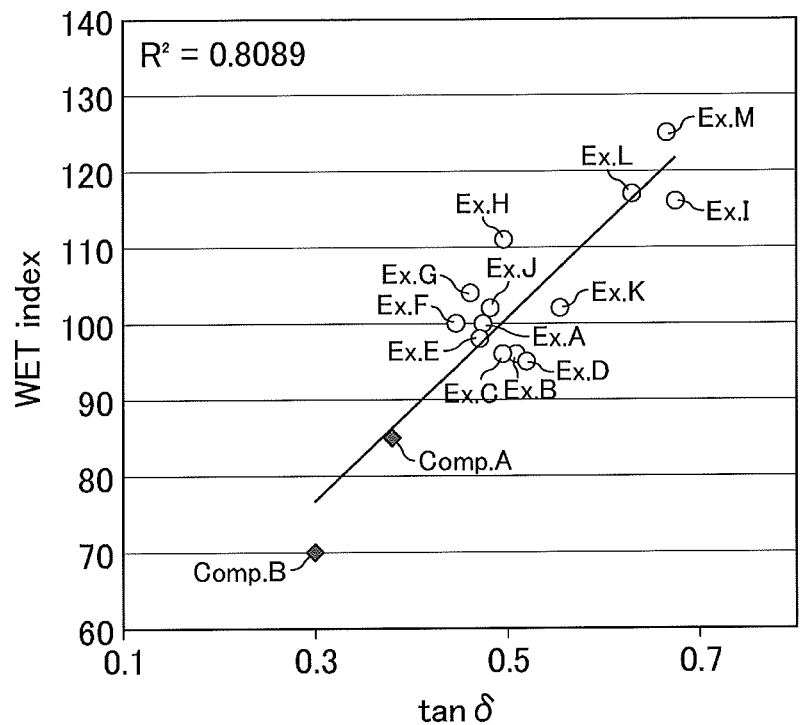
FIG. 3 shows a scatter plot of the variables: tan δ and WET index.
Figure 4:
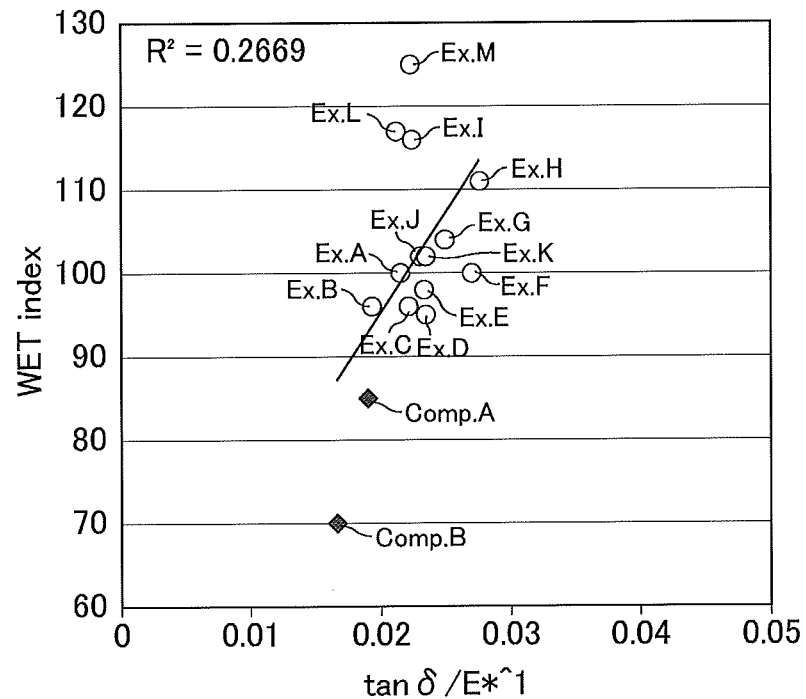
FIG. 4 shows a scatter plot of the variables: tan δ/E* and WET index.
Figure 5:
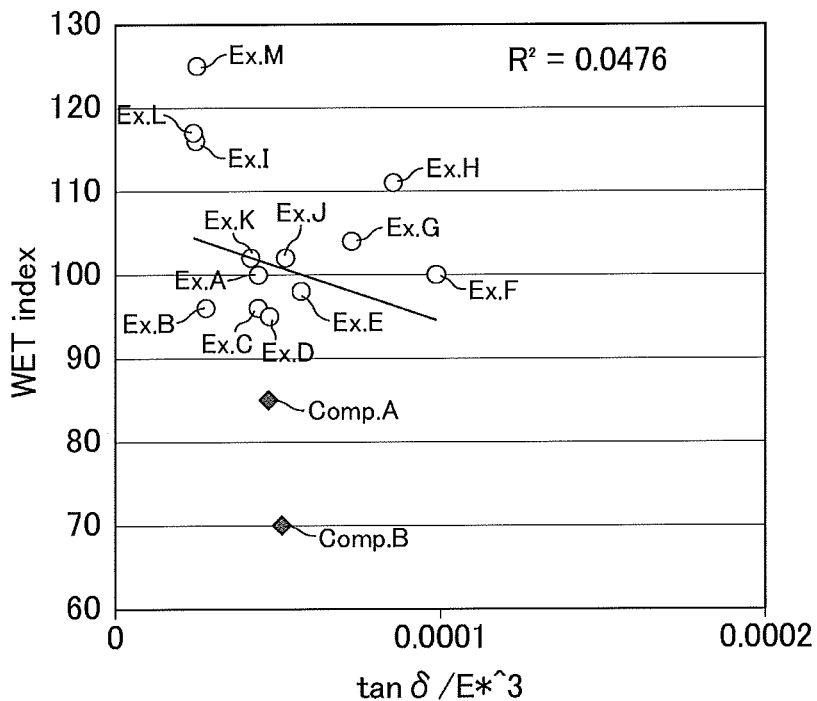
FIG. 5 shows a scatter plot of the variables: tan $\delta/E^{*3}$ and WET index.
Figure 6:
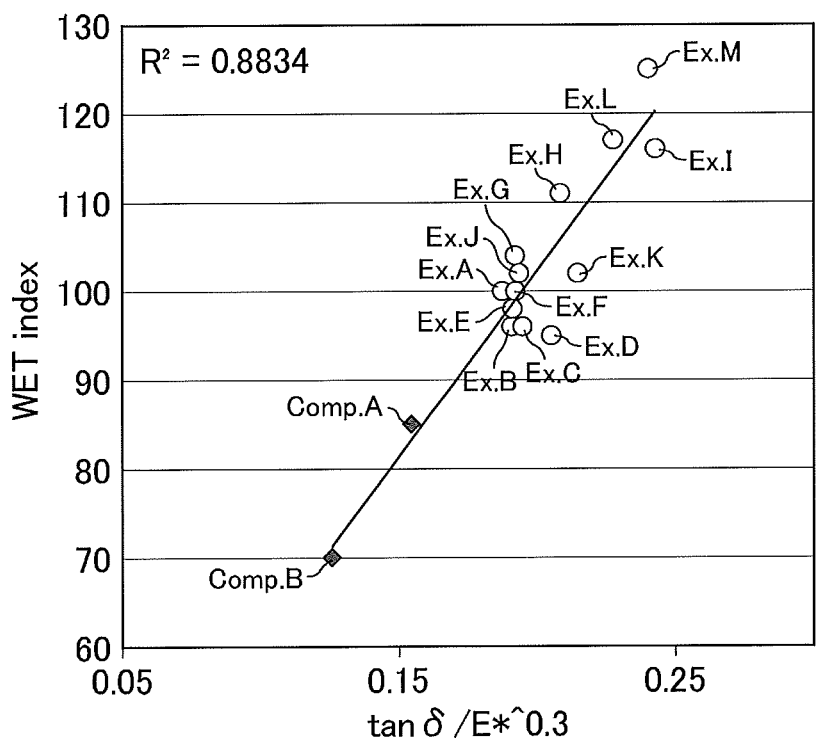
FIG. 6 shows a scatter plot of the variables: tan $\delta/E^{*0.3}$ and WET index.

Scatter plots between the WET index and Tg, $E^*$ or tan δ (variables) measured as above were prepared. Then, fit curves were added to the scatter plots. The correlations between these variables were evaluated based on the obtained coefficients of determination ($R^2$) (FIGS. 1 to 3). The correlations with tan δ/$E^*$, tan δ/$E^{*3}$, and tan δ/$E^{*0.3}$ were also evaluated in the same manner as above (FIGS. 4 to 6). An $R^2$ value within the range of 0.7 to 1.0 indicates a high correlation between the two variables.

TABLE 1

|  |  | Example | | | | | | | |
|---|---|---|---|---|---|---|---|---|---|
|  |  | A | B | C | D | E | F | G | H |
| Formulation (parts by mass) | SBR 1 | — | — | — | — | — | — | — | — |
|  | SBR 2 | 20 | 20 | 20 | 20 | 20 | 20 | 20 | 20 |
|  | SBR 3 | 110 | 110 | 110 | 110 | 110 | 110 | 110 | 110 |
|  | SBR 4 | — | — | — | — | — | — | — | — |
|  | Carbon black N351H | 60 | 60 | 60 | 60 | 60 | 60 | 60 | 60 |
|  | Carbon black N330 | 50 | — | 50 | 50 | 35 | 15 | — | — |
|  | Carbon black N220 | — | 50 | — | — | — | — | 15 | 15 |
|  | Silica | — | — | — | — | 15 | 30 | 30 | 30 |
|  | Resin SA85 | — | — | 5 | 10 | — | — | — | 10 |
|  | Resin V-120 | — | — | — | — | — | — | — | — |
| Evaluation | Tg (° C.) | −32.5 | −33.9 | −29.6 | −28.8 | −33.7 | −32.3 | −33.8 | −29.9 |
|  | $E^*$ (Mpa) | 22.05 | 26.33 | 22.37 | 22.17 | 20.18 | 16.53 | 18.5 | 17.97 |
|  | tan δ | 0.474 | 0.509 | 0.495 | 0.520 | 0.471 | 0.446 | 0.461 | 0.496 |
|  | tan δ/$E^{*0.3}$ | 0.19 | 0.19 | 0.19 | 0.21 | 0.19 | 0.19 | 0.19 | 0.21 |
|  | WET index | 100 | 96 | 96 | 95 | 98 | 100 | 104 | 111 |

|  |  | Example | | | | | Comparative Example | |
|---|---|---|---|---|---|---|---|---|
|  |  | I | J | K | L | M | A | B |
| Formulation (parts by mass) | SBR 1 | 40 | — | — | — | 40 | — | — |
|  | SBR 2 | 40 | 20 | — | — | 40 | 20 | 20 |
|  | SBR 3 | — | 110 | 90 | 90 | — | 110 | 110 |
|  | SBR 4 | 41.4 | — | 46.3 | 46.3 | 41.4 | — | — |
|  | Carbon black N351H | — | 60 | 60 | — | — | 60 | 60 |
|  | Carbon black N330 | — | — | — | — | — | 40 | 30 |
|  | Carbon black N220 | 100 | 20 | 20 | 80 | 100 | — | — |
|  | Silica | — | 30 | 30 | 30 | — | — | — |

TABLE 1-continued

| Evaluation | | | | | | | | |
|---|---|---|---|---|---|---|---|---|
| | Resin SA85 | — | — | — | — | — | — | — |
| | Resin V-120 | 5 | 10 | 10 | 10 | 10 | — | — |
| | Tg (° C.) | −23.7 | −29.2 | −22.9 | −23.9 | −23.1 | −32.5 | −32.5 |
| | E* (Mpa) | 30.13 | 20.93 | 23.66 | 29.74 | 29.89 | 20 | 18 |
| | tan δ | 0.675 | 0.482 | 0.555 | 0.630 | 0.666 | 0.380 | 0.300 |
| | tan δ/E*$^{0.3}$ | 0.24 | 0.19 | 0.21 | 0.23 | 0.24 | 0.16 | 0.13 |
| | WET index | 116 | 102 | 102 | 117 | 125 | 65 | 60 |

Table 1 shows that good wet grip performance was obtained in the examples satisfying the relationship: tan δ/E*$^{0.3}$≥0.18.

As shown in FIGS. 1 to 3, the $R^2$ for tan δ is relatively high, while the $R^2$ for Tg or E* is not so high. Moreover, as shown in FIGS. 4 and 5, the $R^2$ for tan δ/E* or tan δ/E*$^3$ is very low, and thus they have almost no correlation with wet grip performance. In contrast, as shown in FIG. 6, the $R^2$ for tan δ/E*$^{0.3}$ is higher than that for tan δ, and thus the tan δ/E*$^{0.3}$ strongly correlates with wet grip performance.

The invention claimed is:

1. A pneumatic tire, comprising a tread formed from a rubber composition, the rubber composition having a tan δ and an E*, which at 0° C. satisfy the following relationship:

$$\tan \delta/E^{*0.3} \geq 0.18.$$

2. The pneumatic tire according to claim 1, wherein the tan δ and the E* satisfy the following relationship:

$$\tan \delta/E^{*0.3} \geq 0.23.$$

3. The pneumatic tire according to claim 1, wherein the tan δ is 0.420 to 0.680, and the E* is 16.50 to 30.20 Mpa.

4. The pneumatic tire according to claim 1, wherein the rubber composition has a glass transition temperature of −40° C. or higher.

5. The pneumatic tire according to claim 1, wherein the rubber composition comprises a carbon black having a nitrogen adsorption specific surface area of 60 to 150 m$^2$/g and a resin.

6. The pneumatic tire according to claim 1, which is a motorcycle tire.

* * * * *